June 28, 1966   G. H. WILLIAMS ETAL   3,258,080
HORIZONTALLY FOLDED SKIRTS FOR AIR CUSHION BORNE VEHICLES
Filed Oct. 14, 1963   2 Sheets-Sheet 1

United States Patent Office 3,258,080
Patented June 28, 1966

3,258,080
HORIZONTALLY FOLDED SKIRTS FOR AIR
CUSHION BORNE VEHICLES
Geoffrey Hugh Williams, Reading, and Michael Jeremy Bennison, Highworth, England, assignors to Vickers-Armstrongs (Engineers) Limited, London, England, a British company
Filed Oct. 14, 1963, Ser. No. 315,747
Claims priority, application Great Britain, Oct. 15, 1962, 38,984/62
6 Claims. (Cl. 180—7)

This invention relates to vehicles adapted to be borne, at least partially, on an air cushion.

According to the present invention there is provided a vehicle adapted to be borne, at least partially on an air cushion, wherein a skirt depends from the underside of the vehicle body for minimising lateral escape of air from the cushion, portions of the skirt being formed of flexible sheet mterial which has a fold or folds extending substantially horizontally and arranged such that when the lower edge of the skirt portion is deflected up and down the fold or folds close and open.

Figure 1:
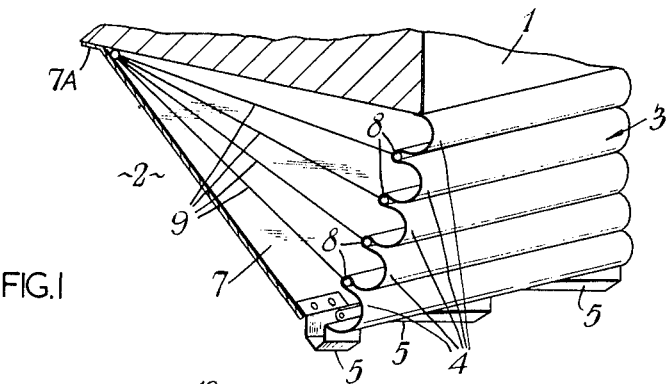
Figure 2:
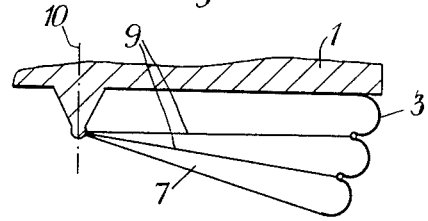
Figure 3:
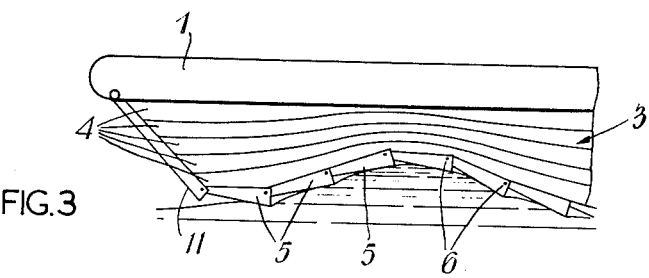
Figure 4:
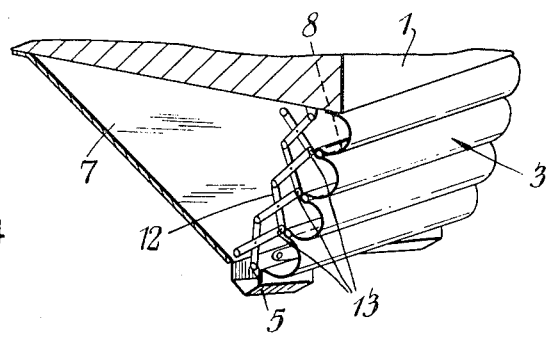
Figure 5:
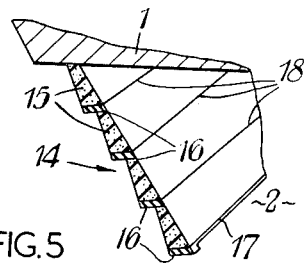
Figure 6:
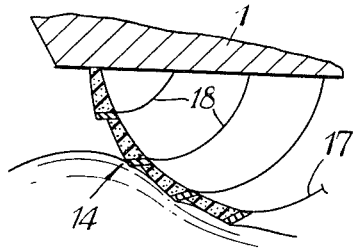
Figure 7:
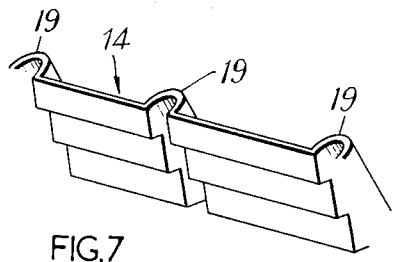
Figure 8:
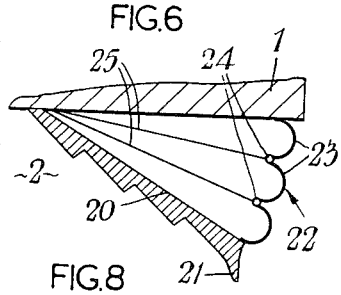
Figure 9:
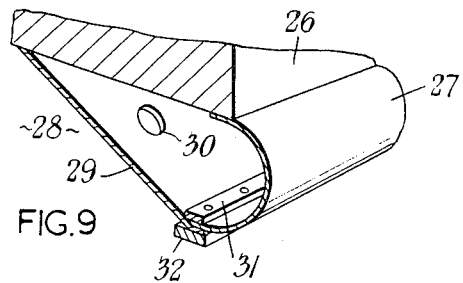
Figure 10:
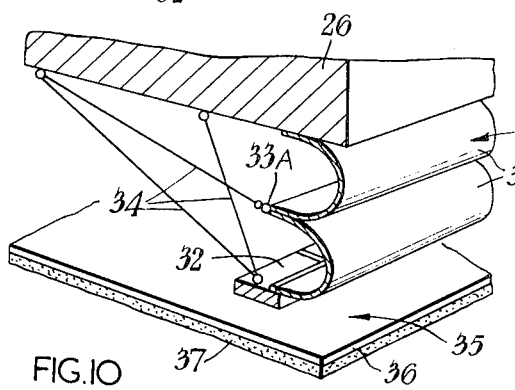
Figure 13:
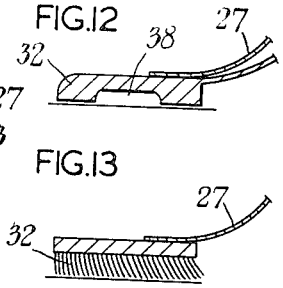

For a better understanding of the invention and to show how the same may be carried into effect, reference will now be made to the accompanying drawings, in which:

FIGURE 1 is a partly sectioned diagrammatic perspective view of part of an air cushion borne vehicle, FIGURE 2 is a diagrammatic transverse sectional view of part of an air cushion borne vehicle, FIGURE 3 is a side elevation of the front part of the vehicle of FIGURE 1, FIGURE 4 is a view like FIGURE 1 and showing a modification, FIGURE 5 is a diagrammatic sectional view of a front skirt part of an air cushion borne vehicle, FIGURE 6 is a diagrammatic sectional view showing the skirt part of FIGURE 5 encountering a wave, FIGURE 7 is a diagrammatic perspective view of a portion of the front skirt part of an air cushion borne vehicle, FIGURE 8 is a diagrammatic sectional view of a rear skirt part for an air cushion borne vehicle, FIGURE 9 is a partly sectioned diagrammatic perspective view of part of another air cushion borne vehicle, FIGURE 10 is a view similar to that of FIGURE 9 of a further air cushion borne vehicle, and FIGURES 11 to 14 are sectional views of different shoes that can be used with the vehicles of FIGURES 9 and 10.

All the vehicles referred to herein are of the kind that are adapted to be supported at least partially by an air cushion formed on the underside thereof, the cushion being supplied with air through an opening or openings in the underside of the vehicle body and there being a skirt depending from the peripheral part of the underside of the vehicle body for encircling the cushion and minimising leakage of air from the cushion to the surrounding atmosphere.

The vehicle of FIGURE 1 has a body 1 that rides on an air cushion 2, the parts, on the longitudinal sides of the vehicle, of the cushion-encircling skirt each being formed by a thin sheet 3 of rubber or similarly flexible material having a plurality of longitudinally extending folds 4, the upper edge of the sheet 3 being secured to the periphery of the underside of the body 1. In vertical section the sheet 3 is of corrugated form, the concavities of the corrugations facing inwards. The bottom edge of the sheet 3 has shoes in the form of planing members 5 secured thereto. Each planing member 5 is channel shaped and diverges in both width and height from the front towards the rear. The planing members 5 are disposed one behind the other with the front part of each member 5 within the channel at the rear end of the immediately preceding member 5. Adjacent members 5 are pivotally secured together by horizontal pins 6 (FIGURE 3). The bottom edge of the sheet 3 is secured to the upper edges of the outside parts of the members 5. The upper edge of the inside part of each member 5 is secured to the bottom longitudinally extending edge of an inclined flexible sheet 7 the opposite edge 7A of which is secured to the underside of the body 1. Longitudinally extending resilient rods 8 are disposed along the fold lines of the sheet 3 and are fixed to the sheet. Ties 9 secure the rods 8 at intervals along the length of the sheet 3 to the underside of the body 1. The lengths of the ties 9 and the corresponding dimension of the flexible sheet 7 are so chosen that successively lower fold lines of the sheet 3 are successively closer to the vertical plane through the longitudinal centre-line of the vehicle. The sheet 3 is thus "set" inwards as it extends downwards. This feature is illustrated more clearly in the diagram of FIGURE 2 which shows part of a vehicle body 1 provided with a skirt in the form of a folded sheet 3 like that of FIGURE 1, the fold lines of the sheet 3 being secured to the underside of the vehicle body by ties 9 and the lower edge of the sheet 3 being secured to the underside of the body 1 by an inclined sheet 7. The vertical plane through the longitudinal centre-line of the vehicle is illustrated by the chain dotted line 10. Preferably the "set" of the sheet 3 (FIGURE 1) is such that a line lying in a transverse vertical plane and passing through the upper and lower edges of the sheet and through the fold lines is not a straight line but is a curved line which as it proceeds downwards bends towards the vertical plane through the longitudinal centre-line of the vehicle and thus away from a vertical line lying in said transverse vertical plane and passing through the upper edge of the sheet 3. The "set" of the sheet 3 is thus greater towards the lower edge of the sheet.

When the vehicle is level and the planing members 5 are clear of the surface over which the vehicle travels the bottom surfaces thereof are inclined at from 7° to 10° to the horizontal, the rear ends of the members 5 being lower than the front ends. The front end of the leading planing member 5 on each longitudinal side of the vehicle is pivotally secured to the lower end of a channel sectioned elongated member 11 (FIGURE 3) the upper end of which is pivotally secured about a horizontal axis to the front end of the vehicle body 1.

In use of the vehicle of FIGURES 1 and 3 air at cushion pressure is communicated either by holes through the sheet 7, or by ducts in the vehicle body 1, to the space on each longitudinal side of the vehicle that is between the sheet 7, the sheet 3 and the underside of the body 1. The vehicle is intended for use over water, and in operation the planing members 5 skim along the surface of the water. Whenever a wave is encountered the planing members 5 deflect the skirt formed by the sheet 3 upwardly, the folds 4 closing and then opening again as the wave passes. Because of the "set" of the sheet 3 the air acting on the inside surface of this sheet has a component urging the sheet 3 downwardly and tending to open the folds whereby the sheet 3 is quickly returned to its initial condition after a wave has passed.

FIGURE 4 illustrates a modification that can be applied to the vehicle of FIGURES 1 and 3 whereby the ties 9 are replaced by approximately upright lazy tongs 12, the outer part of the upper end of each lazy tongs being secured to the peripheral part of the underside of the vehicle body 1 and the outer part of the lower end being secured to a planing member 5. The pivots of the lazy tongs are directed longitudinally of the vehicle, the intermediate ones 13 on the outside of each tongs being secured to the rods 8 extending along the fold lines of the sheet 3. The tongs 12 are disposed so that the sheet 3 has an inwards "set," as in the vehicle of FIGURES 1 and 3.

FIGURE 5 illustrates a skirt part 14 extending across the front of a vehicle like that of FIGURES 1 and 3, the skirt part 14 depending from the underside of the body 1. The skirt part 14 is flexible and has a front face of stepped form. The part 14 is of composite construction and consists of downwardly diverging portions 15 of foam rubber with horizontally extending stiffeners 16 between adjacent portions 15. The lowest stiffener 16 is secured to the lower horizontal edge of an inclined flexible sheet 17 the opposite edge of which is fixed to the underside of the body 1. The remaining stiffeners 16 are secured to the underside of the body 1 by ties 18. It will be noted from FIGURE 5 that the part 14 extends rearwardly and downwardly. In use of the vehicle, cushion pressure acts on the inside surface of the skirt part 14. When the skirt part 14 encounters a wave the skirt part deflects as illustrated in FIGURE 6, the stepped construction of this part minimising the drag effect of the water on the skirt part.

The stiffeners 16 may be inflatable and the rear of the skirt may be provided with stiffening ribs extending in the up-and-down direction to bridge the gaps between the ties 18 and provide small resistance to bending. The stiffening ribs may be in the form of inflated tubes secured to the rear surface of the skirt part 14. If desired the skirt part 14 may be formed in sections as illustrated in FIGURE 7 with an expansion joint 19 between adjacent sections.

FIGURE 8 illustrates a skirt part 20 provided across the rear of a vehicle like that of FIGURES 1 and 3, the skirt part 20 depending downwardly and rearwardly from the underside of the body 1. The skirt part 20 has a stepped front face and at its lower edge is provided with a lip 21. The lower edge of the skirt part 20 is joined to the rear edge of the underside of the vehicle body 1 by a flexible sheet 22 similar to the sheet 3, the sheet 22 having transverse horizontally extending folds 23 with the fold lines provided with resilient rods 24 connected to the underside of the body 1 by ties 25. In use of the vehicle air at cushion pressure is communicated to the space between the sheet 22, the skirt part 20 and the underside of the body 1. The lip 21 has sufficient stiffness to resist cushion pressure and impedes loss of air from the cushion 2 beneath the skirt part 20. However, the lip 21 is sufficiently flexible easily to bend backwards under hydrodynamic loads. Similarly, the skirt part 20 can itself bend similarly to the front skirt part 14, the air acting on the rear surface of the skirt part 20 after deflection assisting in returning the skirt part 20 after deflection thereof, to its original state. The skirt part 20 may be provided with expansion joints like the joints 19 shown in FIGURE 7.

FIGURE 9 illustrates a convoluted skirt construction for a land vehicle. The vehicle has a body 26 the underside of which is provided with a skirt 27 that encircles an air cushion 28 which supports, or assists in supporting, the weight of the vehicle. The skirt 27 is of flexible sheet material and has a single fold. The upper edge of the skirt 27 is secured directly to the vehicle body 26 and the lower edge is attached to one edge of an inclined flexible sheet 29 the opposite edge of which is secured to the underside of the body 26. The sheet 29 has holes 30 for communicating air at cushion pressure to the space between the sheet 29, the skirt 27 and the underside of the body 26. A strip 31 extends along the upper side of the bottom part of the skirt 27 and the underside of the bottom part of the skirt 27 is provided with a shoe or shoes 32 for sliding on the surface over which the vehicle travels. A shoe 32 may be provided which is in the form of a flexible strip extending along the bottom of the skirt 27. Alternatively discrete side-by-side shoes 32 may be provided and these shoes may be hingedly connected each to its two adjacent ones, the hinge axes being horizontal and transverse to the skirt.

Figure 11:
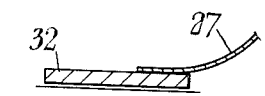
Figure 12:
Figure 14:

FIGURE 10 illustrates a construction similar to that of FIGURE 9 except that the skirt 27 has two horizontal folds 33 and the sheet 29 is dispensed with, the lower edge of the skirt and a horizontal rod 33A along the fold line between the two folds 33 being attached to the underside of the body 26 at intervals along the skirt 27 by ties 34. In a modification (not shown) additional ties extend horizontally across the vehicle from the rod 33A and the lower edge of the skirt to the opposite side of the skirt to which they are attached. The vehicle of FIGURE 10 is shown with its shoes 32 sliding on the upper surface of a mat 35 that has been laid over the surface of the ground. The mat 35 has a smooth upper layer 36 formed of non-porous relatively hard rubber, or like flexible material, and a lower and thicker layer 37 of sponge rubber. The shoes 32 may be formed of flexible relatively hard rubber and can be treated on the lower surface thereof with polytetrafluorethylene to assist the sliding of the shoes. Alternative forms of shoe construction are shown in FIGURES 11 to 14. The under surface of the shoe 32 of FIGURE 11 is flat whereas that of FIGURE 12 is stepped. The shoe of FIGURE 13 has a cavity 38 on the underside thereof between inner and outer parts of the under surface of the shoe. The shoe 32 of FIGURE 14 is in the form of a brush.

We claim:

1. A vehicle adapted to be borne at least partially on an air cushion, the vehicle comprising a vehicle body, there being an air cushion space beneath the body, a skirt depending from the underside of the vehicle body for minimising lateral escape of air from the cushion, a part of the skirt being formed of flexible sheet material having a plurality of folds extending substantially horizontally whereby when the lower edge of the skirt is deflected up and down relative to the vehicle body each fold closes and opens, respectively, a resilient rod secured to said part of the skirt and disposed along each fold line located along the junctions of each fold with adjacent folds, and ties securing each rod to the underside of the vehicle body.

2. A vehicle according to claim 1 and further comprising a sheet of flexible material, the lower edge of the skirt part being attached to one edge of said sheet, the sheet being inclined so that it extends from said one edge inwardly with respect to the air cushion space and upwardly, and the opposite edge of said sheet being secured to the underside of the vehicle body.

3. A vehicle according to claim 2, wherein holes are formed in the inclined sheet for permitting air to flow from the air cushion to the space between the inclined sheet, the skirt part and the underside of the vehicle body.

4. A vehicle according to claim 1, wherein at least one shoe is secured to the lower edge of the skirt part for co-operating with the surface over which the vehicle travels.

5. A vehicle according to claim 4 and serving for use over water, the vehicle comprising a plurality of shoes each in the form of a planing member, the skirt part extending longitudinally of the vehicle and the planing members being one behind the other, the leading end of each planing member except the leading member being pivotally attached to the rear end of the immediately preceding planing member.

6. A vehicle according to claim 1, in which said plurality of folds of said part of the skirt in vertical section is of corrugated form, the concavities of the corrugations of which face toward the air cushion space beneath the body of the vehicle, and in which the resilient rod is disposed along the fold line formed by the junctions of each corrugation with adjacent corrugations.

References Cited by the Examiner

UNITED STATES PATENTS

| | | | |
|---|---|---|---|
| 936,395 | 10/1909 | Worthington | 180—7 |
| 3,082,836 | 3/1963 | Billman | 180—7 |

BENJAMIN HERSH, *Primary Examiner.*

M. S. SALES, *Assistant Examiner.*